United States Patent Office 3,316,058
Patented Apr. 25, 1967

---

3,316,058
PROCESS FOR THE EXTRACTION OF TUNGSTEN FROM AQUEOUS SOLUTION
Charles L. Chaney, Del Mar, Calif., assignor to the United States of America as represented by the Secretary of the Interior
No Drawing. Filed Dec. 19, 1962, Ser. No. 247,452
8 Claims. (Cl. 23—19)

The invention herein described and claimed may be manufactured and used by or for the Government of the United States of America for governmental purposes without the payment of royalties thereon or therefor.

This invention relates to a process for extracting tungsten from aqueous solution by means of an organic amine extractant. The invention finds particularly utility in recovery of tungsten from its ores.

The ability of tungsten to harden metals with which it is alloyed makes it a valuable element in the manufacture of various metal products such as machine-tool steels. Drawn tungsten wire is also indispensable in the manufacture of electric lamps. The metal is usually obtained from ores such as scheelite ($CaWO_4$), wolframite (a tungstate of iron and manganese), hubernite and tungstite by means of solubilization of the tungsten values in the form of sodium or potassium tungstate which is then purified by a series of repeated crystallizations as ammonium para-tungstate or tungstic acid. This is usually done by digesting the ore concentrate from conventional dressing techniques such as gravity concentration, flotation, etc., with an aqueous alkaline solution such as aqueous sodium hydroxide, sodium carbonate or potassium carbonate. Alternatively, the ore concentrate may be fused with the solid alkaline reagent followed by leaching with water. While these and related recovery techniques have met with varying degrees of success, the difficulty of recovering the thus solubilized tungsten makes such procedures relatively cumbersome and costly.

It has now been found that tungsten may be recovered simply and inexpensively from aqueous solutions resulting form the above solubilization techniques by extraction with aniline in the presence of a weak acid such as acetic acid so as to provide a pH of about 4.

According to a preferred embodiment of the invention, the tungsten ore is fused with sodium hydroxide at about 850° C., the cooled fused material is leached with water or acetic acid solution and the insoluble gangue and hydroxides filtered off. The pH of the aqueous solution is then adjusted to about 4 with glacial acetic acid and tungsten is extracted from the solution by means of aniline. The tungsten is removed from the aniline extractant by any conventional organic destruction methods or stripping procedures.

Use of a proper value of pH has been found to be essential in the process of the invention with a pH of about 4 generally being most satisfactory. However, the extraction may be made using a pH of about 3.5 to about 5.5; the optimum value will depend on variables such as the type of ore, alkali used to decompose the ore, etc., and is, therefore, best determined experimentally.

Since a very low value of pH is not satisfactory, mineral acids cannot be used. As indicated above, acetic acid has been found to give very good results; the tungsten acetate solution has been found to be stable for several months at a pH as low as 3.5 and tungsten concentrations as high as 5.0 grams/50 ml. can be obtained. However, other acids such as acetic, tartaric or citric acids, capable of providing the required pH value, may also be used.

Though applicant does not wish to be bound by any theory of operation, it is believed that a complex is formed between the tungsten and the aniline which is soluble in the extractant, thus enabling efficient removal from the aqueous solution.

The following examples will serve to more particularly describe the invention.

*Example 1*

5 grams each of hubernite, scheelite, tungstite and wolframite were placed in different nickel crucibles containing 10 grams each of NaOH. The mixtures were fused over a gas burner until a red molten mass was formed at a temperature of approximately 850° C. The fusions were cooled and leached in 250 ml. of water and the leached solutions filtered to remove gangue and insoluble hydroxides. The clear filtrates were adjusted at 25° C. to a pH of 4.0 with about 50 ml. of glacial acetic acid, followed by shaking with 50 ml. of aniline to extract the tungsten. No emulsions were encountered. The excess aniline was removed from the extracts by heating it just below the boiling point to dryness and then igniting in a muffle at 800–1000° C. for 1–2 hours to decompose the tungsten-aniline complex to $WO_3$.

Though the invention finds greatest utility in recovery of tungsten from its ores, the process may be used for separation or recovery of tungsten from any aqueous solutions containing tungsten and is not limited to the ore as a source of the aqueous tungsten solution. Other tungsten materials to which the process is applicable are oxides, halides, oxyhalides, sulfides and metallic tungstates. Since the process is very effective in extracting tungsten without simultaneously extracting closely related elements, it may be used in a wide variety of procedures such as purification or analytical procedures. The following examples illustrate the process of the invention using $WO_3$ and $Na_2WO_4 \cdot 2H_2O$, as starting material in place of the ore.

*Example 2*

6.3 grams $WO_3$ was sintered with 5.0 grams of $Li_2CO_3$ at 800° C. The sinter was cooled and leached in 50 ml. of 1:1 acetic acid for 1.0 hour. The pH of the resulting solution was 4.0 at 25° C. The leached solution was then shaken for three minutes with 50 ml. of aniline. After 15 minutes, two transparent liquid phases had separated. The heavier dark red phase was found to contain aniline and tungsten.

*Example 3*

5.0 grams of $Na_2WO_4 \cdot 2H_2O$ was dissolved in 250 ml. of water. The pH of the solution was adjusted to 4.0 at 25° C. with glacial acetic acid and shaken for three minutes with three different portions of 50 ml. of aniline. A heavy dark red liquid phase separated readily in each case upon standing for 15 minutes. An analysis for tungsten was made on the extracted solution using the conventional cinchonine alakaloid analytical procedure which is described in "Scott's Standard Methods of Chemical Analysis" by Wilfred W. Scott, 5th ed., vol. 1, pages 1005, 1011. The analysis showed that 99.66% of the tungsten was extracted.

Though NaOH is the preferred material for decomposition of the ores by fusion, numerous other alkaline materials may be used, such as $NaHCO_3$, $KHCO_3$, $LiHCO_3$, $Ca(OH)_2$, LiOH, KOH, $Li_2CO_3$, $Na_2CO_3$, $K_2CO_3$, $CaCO_3$. Mixtures of these compounds may also be used. Boiling aqueous solutions of the alkaline material may also be used for the decomposition rather than the solid alkaline reagent.

Tungsten may be stripped from the tungsten-aniline solutions by shaking with one normal NaOH. After 1–2 minutes two immiscible liquids separate; the lighter phase is aniline, the heavier phase is sodium tungstate. The sodium tungstate solution is acidified with 1:2 HCl to precipitate tungstic acid which is filtered off and ignited at about 800° C to $WO_3$. This procedure has the advantage that the aniline is not lost but may be recycled for further extraction. Other bases can also be used to strip the tungsten from the aniline solution, e.g., KOH, LiOH, $NH_4OH$ and $Ca(OH)_2$.

What is claimed is:

1. A process for extraction of tungsten from aqueous solution comprising adjusting the pH of the solution to about 3.5 to about 5.5 with an acid selected from the group consisting of citric acid, tartaric acid, and acetic acid and, thereafter contacting the solution with aniline to form an aniline extract phase containing a tungsten-aniline complex and an aqueous raffinate phase, separating the extract and raffinate phases and recovering the tungsten from the extract phase.

2. Process of claim 1 in which the aqueous tungsten solution is prepared by alkaline decomposition of a tungsten ore.

3. Process of claim 2 in which the ore is fused with a solid alkaline material followed by leaching with a material form the group consisting of water and a solution of an acid selected from the group consisting of citric acid, tartaric acid and acetic acid.

4. Process of claim 3 in which the alkaline material is sodium hydroxide.

5. Process of claim 1 in which the pH is adjusted to about 4.0 prior to extraction.

6. Process of claim 1 in which acetic acid is used to adjust the pH.

7. Process of claim 1 in which the tungsten is recovered from the extract phase by heating to dryness to remove excess aniline and igniting to convert the tungsten-aniline complex to tungstic oxide.

8. Process of claim 1 in which the tungsten is recovered from the extract phase by stripping with an alkaline solution to form sodium tungstate, acidifying to form tungstic acid and igniting to convert the tungstic acid to tungstic oxide.

References Cited by the Examiner

UNITED STATES PATENTS

| 2,877,250 | 3/1959 | Brown et al. | |
| 3,079,226 | 2/1963 | Newkirk | 23—140 X |
| 3,083,076 | 3/1963 | Drobnick et al. | |
| 3,083,085 | 3/1963 | Lewis et al. | 23—22 X |
| 3,158,438 | 11/1964 | Kurtak | 23—22 |

OTHER REFERENCES

Coleman et al., Proceedings of the International Conference on Peaceful Uses of Atomic Energy, vol. 28, pp. 278–288, Geneva 1958.

OSCAR R. VERTIZ, *Primary Examiner.*

H. T. CARTER, *Assistant Examiner.*